United States Patent [19]
Stine

[11] Patent Number: 5,390,561
[45] Date of Patent: Feb. 21, 1995

[54] COMPOUND TRANSMISSION

[75] Inventor: Alan C. Stine, Kalamazoo, Mich.

[73] Assignee: Eaton Corporation, Cleveland, Ohio

[21] Appl. No.: 63,792

[22] Filed: May 20, 1993

[51] Int. Cl.⁶ .............................................. F16H 3/08
[52] U.S. Cl. ...................................................... 74/331
[58] Field of Search .......................... 74/330, 331, 333

[56] References Cited

U.S. PATENT DOCUMENTS

| | | | |
|---|---|---|---|
| 3,105,395 | 10/1963 | Perkins | 74/331 |
| 3,159,044 | 12/1964 | Feuillastre | 74/745 |
| 3,349,635 | 10/1967 | Richards | 74/331 |
| 3,817,123 | 6/1974 | Whateley et al. | 74/745 |
| 4,136,575 | 1/1979 | Labat | 74/331 |
| 4,226,135 | 10/1980 | Winter | 74/330 |
| 4,375,171 | 3/1983 | Morscheck | 74/331 |
| 4,627,301 | 12/1986 | Bainbridge et al. | 74/333 |
| 4,754,665 | 7/1988 | Vandervoort | 74/745 |
| 4,807,493 | 2/1989 | Loeffler | 74/333 |
| 4,901,600 | 2/1990 | Wilson | 74/331 |
| 4,944,197 | 7/1990 | Stine et al. | 74/477 |

OTHER PUBLICATIONS

"The New RT-910 10-Speed Roadranger and family of twin countershaft Transmissions" by Fuller Transmission Division, Feb., 1963.

Primary Examiner—F. Daniel Lopez
Attorney, Agent, or Firm—Howard D. Gordon

[57] ABSTRACT

A compound transmission (110) of lighter weight and/or shorter axial length as compared to comparable prior art transmissions is provided. The compound transmission of the present invention utilizes main transmission section countershafts (124) and auxiliary transmission section countershafts (162) which are coaxial and am supposed for independent rotation within a common transmission housing (116) solely by means of bearings (126, 162D) carried by the forward transmission end wall (116A) and the rearward transmission end wall (116B). The transmission mainshaft (146) is supposed for rotation within the transmission housing solely by the input shaft (118) and/or the output shaft (158). One of the countershafts (162) and/or the mainshaft (146) may be of a tubular structure and telescopically surrounds the other of the countershafts (124) and one of the input and/or output shafts, respectively.

27 Claims, 10 Drawing Sheets

COMPOUND TRANSMISSION

BACKGROUND OF THE INVENTION

1. Related Applications

This application is related to U.S. patent application Ser. No. 08/063,829 titled HELICALLY GEARED COMPOUND TRANSMISSION, assigned to the same assignee, Eaton Corporation, as this application and filed the same day, May 20, 1993 as this application.

2. Field of the Invention

The present invention relates to an improved compound mechanical change gear transmission structure, preferably for compound transmissions of the multiple substantially identical countershaft type. In particular, the present invention relates to an improved compound mechanical transmission structure allowing, for a given transmission capacity and life, the provision of a lighter, axially shorter and/or less costly transmission as compared to comparable prior art transmission structures.

3. Description of the Prior Art

Compound change gear transmissions, usually vehicular transmissions for heavy duty vehicles, of the type having one or more auxiliary sections connected in series with a main transmission section are well known in the prior art. Briefly, by utilizing main and auxiliary transmission sections connected in series, assuming proper sizing of the ratio steps, the total of available transmission ratios is equal to the product of the main and auxiliary section ratios. By way of example, at least in theory, a compound change gear transmission comprising a four (4) forward speed main section connected in series with a three (3) speed auxiliary section will provide twelve (4×3=12) available forward ratios.

Auxiliary transmission sections are of three general types: range type, splitter type or combined range/splitter type.

In compound transmissions having a range type auxiliary section, the auxiliary section ratio step or steps are greater than the total ratio coverage of the main transmission section ratios used in both ranges and the main section is shifted progressively through its ratios in each range. Examples of compound transmissions having range type auxiliary sections may be seen by reference to U.S. Pat. Nos. 3,105,395; 2,637,222 and 2,637,221, the disclosures of which are hereby incorporated by reference.

In compound transmissions having a splitter type auxiliary section, the ratio steps of the splitter auxiliary section are less than the ratio steps of the main transmission section and each main section ratio is split, or subdivided, by the splitter section. Examples of compound change gear transmissions having a splitter type auxiliary sections may be seen by reference to U.S. Pat. Nos. 4,290,515; 3,799,002; 4,440,037 and 4,527,447, the disclosures of which are hereby incorporated by reference.

In a combined range and splitter type auxiliary section, or sections, both range and splitter type ratios are provided allowing the main section to be progressively shifted through its ratios in at least two ranges and also allowing one or more of the main section ratios to be split in at least one range.

One example of a compound transmission having a single combined range/splitter type auxiliary section may be seen by reference to U.S. Pat. Nos. 3,283,613; 3,648,546, the disclosures of which are hereby incorporated by reference. Another example is the "Ecosplit" model of transmission sold by Zahnradfabrik Friedrichshafen Aktiengeseushaft of Friedrichshafen, Federal Republich of Germany which utilizes a separate splitter auxiliary section in front of, and a separate range auxiliary section behind, the main transmission section.

Another example of a compound vehicular transmission having a single combined three gear layer, four-speed combined splitter/range transmission may be seen by reference to U.S. Pat. Nos. 4,754,665 and 4,944,197, the disclosures of which are incorporated herein by reference.

It should be noted that the terms main and auxiliary sections are relative and that if the designations of the main and auxiliary sections are reversed, the type of auxiliary section (either range or splitter) will also be reversed. In other words, given what is conventionally considered a four-speed main section with two-speed range type auxiliary section, if the normally designated auxiliary is considered the main section, the normally designated main section would be considered a four-speed splitter type auxiliary section therefor. By generally accepted transmission industry convention, and as used in this description of the invention, the main transmission section of a compound transmission is that section which contains the largest (or at least no less) number of forwards speed ratios, which allows selection of a neutral position, which contains the reverse ratio(s) and/or which is shifted (in manual or semiautomatic transmissions) by manipulation of a shift bar or shift rail or shift shaft/shift finger assembly as opposed to master/slave valve/cylinder arrangements or the like.

The prior art compound change gear transmissions, especially the prior art compound transmissions of the type having both range and splitter type auxiliary section gearing, such as the "Roadranger" type and "Super 10" type offered by Eaton Corporation and the "Ecosplit" type offered by Zahnradfabrik Friedrichshafen Aktiengeseushaft, are well received and widely used in manually shifted heavy duty vehicles. However, these and other types of prior art compound change gear transmissions are not totally satisfactory as it is an ongoing objective, especially for vehicular transmissions, to provide transmissions of equal or improved capacities and reliability which use fewer pans and/or are axially shorter and/or lighter in weight as compared to prior art transmissions of comparable capacity and reliability.

SUMMARY OF THE INVENTION

In accordance with the present invention, compound transmissions of an improved structure are provided which use fewer pans and/or are axially shorter and/or of a lighter weight as compared to comparable prior art compound transmissions of equivalent capacity and reliability.

The above is accomplished by providing a compound transmission wherein (i) the main and auxiliary section countershafts form a coaxial assembly of countershafts supported solely by bearings in the front and rear end walls of the transmission housing, preferably one of the main and auxiliary section countershafts extend from the forward to the rearward housing end walls and the other of the countershafts is a generally tubular member surrounding and rotationally supported on the one countershaft and/or (ii) the mainshaft is supported solely by the input and/or output shafts without intermediate bearings journalled in an intermediate housing wall, for example, the inner ends of the input shaft assembly and the output shaft assembly may axially overlap and provide mutual support and the mainshaft may be a tubular member surrounding, preferably in a radially floating manner, the input and/or output shafts for independent rotation relative thereto. The above structure eliminates the requirement of all or a large portion of the intermediate housing wall(s) and the various shaft support bearings associated therewith which are necessary in comparable prior art compound transmission designs. Elimination of all or most of the housing intermediate wall and the associated bearings, beating retainers and the like allows the provision of compound change gear transmissions of relatively lighter weight, shorter axial length and/or fewer parts as compared to comparable prior art transmissions.

Accordingly, it is an object of the present invention to provide a new and improved compound change gear transmission.

This and other objects and advantages of the present invention will become apparent from a reading of the detailed description of the preferred embodiment taken in connection with the attached drawings.

DESCRIPTION OF THE PREFERRED EMBODIMENT

Figure 1:
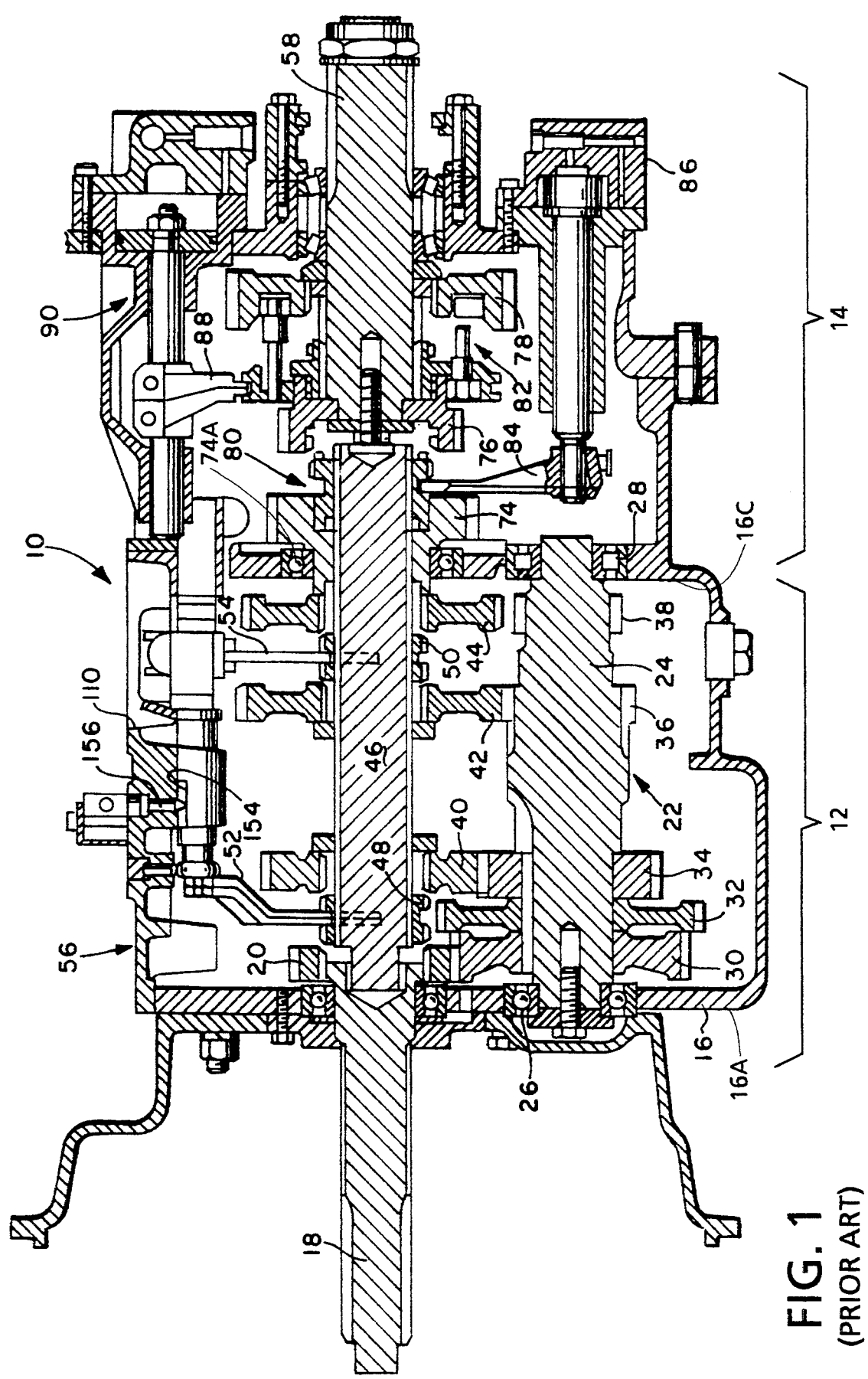
FIGS. 1 and 1A are cross-sectional views of a prior art compound transmission.

Certain terminology will be used in the following description for convenience only and will not be limiting. The words "upwardly", "downwardly", "rightwardly", and "leftwardly" will designate directions in the drawings to which reference is made. The words "forward" and "rearward" will refer respectively to the front and rear ends of the transmission as conventionally mounted in the vehicle, being respectfully to the left and right sides of the transmission as illustrated in FIG. 1. The words "inwardly" and "outwardly" will refer to directions toward and away from, respectively, the geometric center of the device and designated parts thereof. Said terminology includes the words above specifically mentioned, derivatives thereof and words of similar import.

The term "compound transmission" is used to designate a change speed or change gear transmission having a main transmission section and an auxiliary drive train unit, such as an auxiliary transmission section, connected in series whereby the selected gear reduction in the main transmission section may be compounded by further selected gear reduction in the auxiliary transmission section. The term "upshift" as used herein shall mean the shifting from a lower speed gear ratio to a higher speed gear ratio and the term "downshift" as used herein shall mean the shifting from a higher speed gear ratio to a lower speed gear ratio. The terms "low speed gear" or "low gear" as used herein shall designate a gear utilized for relatively lower forward speed operation in a transmission, i.e., a set of gears having a higher ratio of reduction of output shaft speed relative to the speed of the input shaft. "Synchronized clutch assembly" and words of similar import shall designate a clutch assembly" and words of similar import shall designate a clutch assembly utilized to nonrotatably couple a selected gear to a shaft by means of a positive clutch in which attempted engagement of said clutch is prevented until the members of the clutch are at substantially synchronous rotation and relative large capacity friction means are associated with the clutch members and are sufficient, upon initiation of a clutch engagement, to cause the clutch members and all members rotating therewith to rotate at a substantially synchronous speed.

Figure 1A:
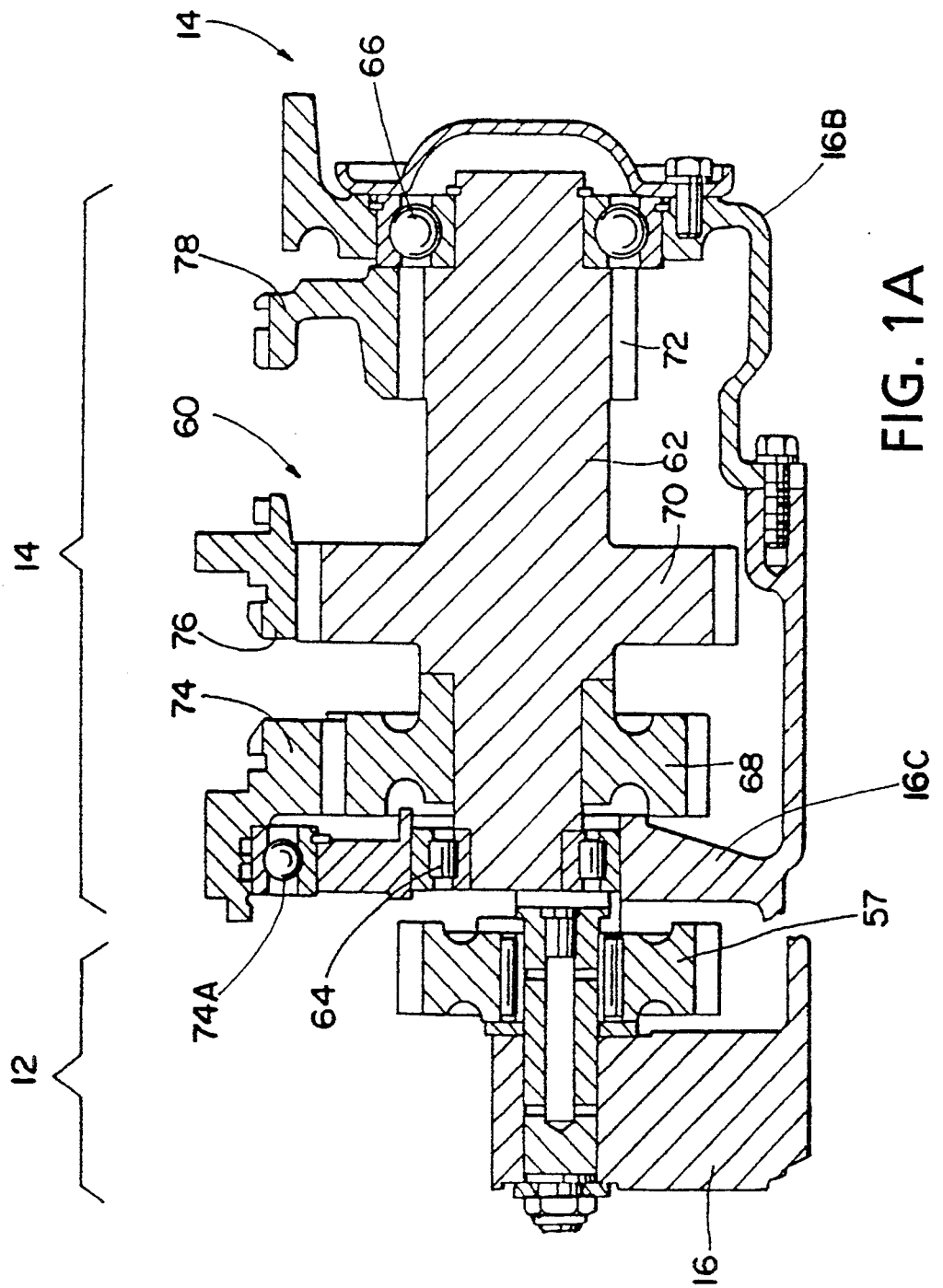

Referring now to FIGS. 1 and 1A, the prior art compound transmission 10 is illustrated. Transmission 10 comprises a main transmission section 12 connected in series with an auxiliary transmission section 14 having both range and splitter type gearing. Typically, transmission 10 is housed within a single multi-piece housing 16 and includes an input shaft 18 driven by a prime mover such as a diesel engine (not shown) through a selectively disengaged, normally engaged, friction master clutch (not shown).

In the main transmission section 12, the input shaft 18 carries an input gear 20 for driving at least one countershaft assembly 22. Preferably, as is well known in the prior art and as is illustrated in U.S. Patent Nos. 3,105,395 and 3,335,616, the disclosures of which are hereby incorporated by reference, input gear 20 simultaneously drives a plurality of substantially identical mainsection countershaft assemblies at substantially identical rotational speeds. Each of the mainsection countershaft assemblies comprises a mainsection countershaft 24 supported by bearings 26 and 28 in housing 16 and is provided with mainsection countershaft gears 30, 32, 34, 36 and 38 fixed thereto. A plurality of mainsection drive or mainshaft gears 40, 42 and 44 surround the transmission mainshaft 46 and are selectively clutchable, one at a time, to the mainshaft 46 for rotation therewith by sliding clutch collars 48 and 50 as is well known in the art. Clutch collar 48 may also be utilized to clutch input gear 20 to the mainshaft 46 to provide a direct drive relationship between the input shaft 18 and the mainshaft 46. Preferably, each of the mainsection mainshaft gears encircles the mainshaft 46 and is in continuous meshing engagement with and is floatingly supported by the associated countershaft gear groups, which mounting means and special advantages resulting therefrom are explained in greater detail in above-mentioned U.S. Pat. Nos. 3,105,395 and 3,335,616. Typically, clutch collars 48 and 50 are axially positioned by means of shift forks or yokes 52 and 54, respectively, associated with a shift bar housing assembly 56. Clutch collars 48 and 50 are, in the illustrated preferred embodiment, of the well known non-synchronized double acting jaw clutch type but may also be of the synchronized type as illustrated in U.S. Pat. Nos. 4,989,706 and 5,141,087, the disclosures of which are incorporated herein by reference.

Main section mainshaft gear 44 is the reverse gear and is in continuous meshing engagement with countershaft gears 38 by means of conventional intermediate idler gears 57 (see FIG. 1A). Main section countershaft gear 32 is provided for powering power takeoff devices and the like. Jaw clutches 48 and 50 are three-position clutches in that they may be positioned in a centered axially nondisplaced, nonengaged position as illustrated or in a fully rightwardly engaged or fully leftwardly engaged position.

Auxiliary transmission section 14 is connected in series with main transmission section 12 and is of the three-layer, four speed combined splitter/range type as illustrated in above-mentioned U.S. Pat. No. 4,754,665. Mainshaft 46 extends into the auxiliary section 14 and is journalled in the inward end of the output shaft 58 which extends from the rearward end of the transmission.

Auxiliary transmission section 14 includes a plurality of substantially identical auxiliary countershaft assemblies 60 (see FIG. 1A) each comprising an auxiliary countershaft 62 supported by bearings 64 and 66 in housing 16 and carrying three auxiliary section countershaft gears 68, 70 and 72 fixed for rotation therewith. Auxiliary countershaft gears 68 are constantly meshed with and support auxiliary section splitter gear 74. Auxiliary countershaft gears 70 are constantly meshed with and support auxiliary section splitter/range gear 76 which surrounds the output shaft 58 at the end thereof adjacent the coaxial inner end of mainshaft 46. Auxiliary section countershaft gears 72 constantly mesh with and support auxiliary section range gear 78 which surrounds the output shaft 58. Accordingly, auxiliary section countershaft gears 68 and splitter gear 74 define a first gear layer, auxiliary section countershaft gears 70 and splitter/range gear 76 define a second gear layer and auxiliary section countershaft gears 72 and range gear 78 define a third layer, or gear group, of the combined splitter and range type auxiliary transmission section 14.

A sliding two-position jaw clutch collar 80 is utilized to selectively couple either the splitter gear 74 or the splitter/range gear 76 to the mainshaft 46 while a two-position synchronized clutch assembly 82 utilized to selectively couple the splitter/range gear 76 or the range gear 78 to the output shaft 58. The structure and function of double-acting jaw clutch collar 80 is substantially identical to the structure and function of the sliding clutch collars 48 and 50 utilized in the main transmission section 12 and the function of double-acting synchronized clutch assembly 82 is substantially identical to the structure and function of prior art double-acting synchronized clutch assembly, examples of which may be seen by reference to U.S. Pat. Nos. 4,462,489; 4,125,179 and 2,667,955 the disclosures of all of which are hereby incorporated by reference. The synchronized clutch assembly 82 illustrated is of the pin-type described in above-mentioned U.S. Pat. No. 4,462,489.

The splitter jaw clutch 80 is a two-position clutch assembly which may be selectively positioned in the rightwardmost or leftwardmost positions for engaging either gear 76 or gear 74, respectively, to the mainshaft 46. Splitter jaw clutch 80 is axially positioned by means of a shift fork 84 controlled by a two-position piston actuator 86 which is operable by a driver selection switch such as a button or the like on the shift knob (not shown) as is known in the prior art. Two-position synchronized clutch assembly 82 is also a two-position clutch which may be selectively positioned in either the rightwardmost or leftwardmost positions thereof for selectively clutching either gear 78 or 76, respectively, to output shaft 58. Clutch assembly 82 is positioned by means of a shift fork 88 operated by means of a two-position piston device 90.

Figure 6:
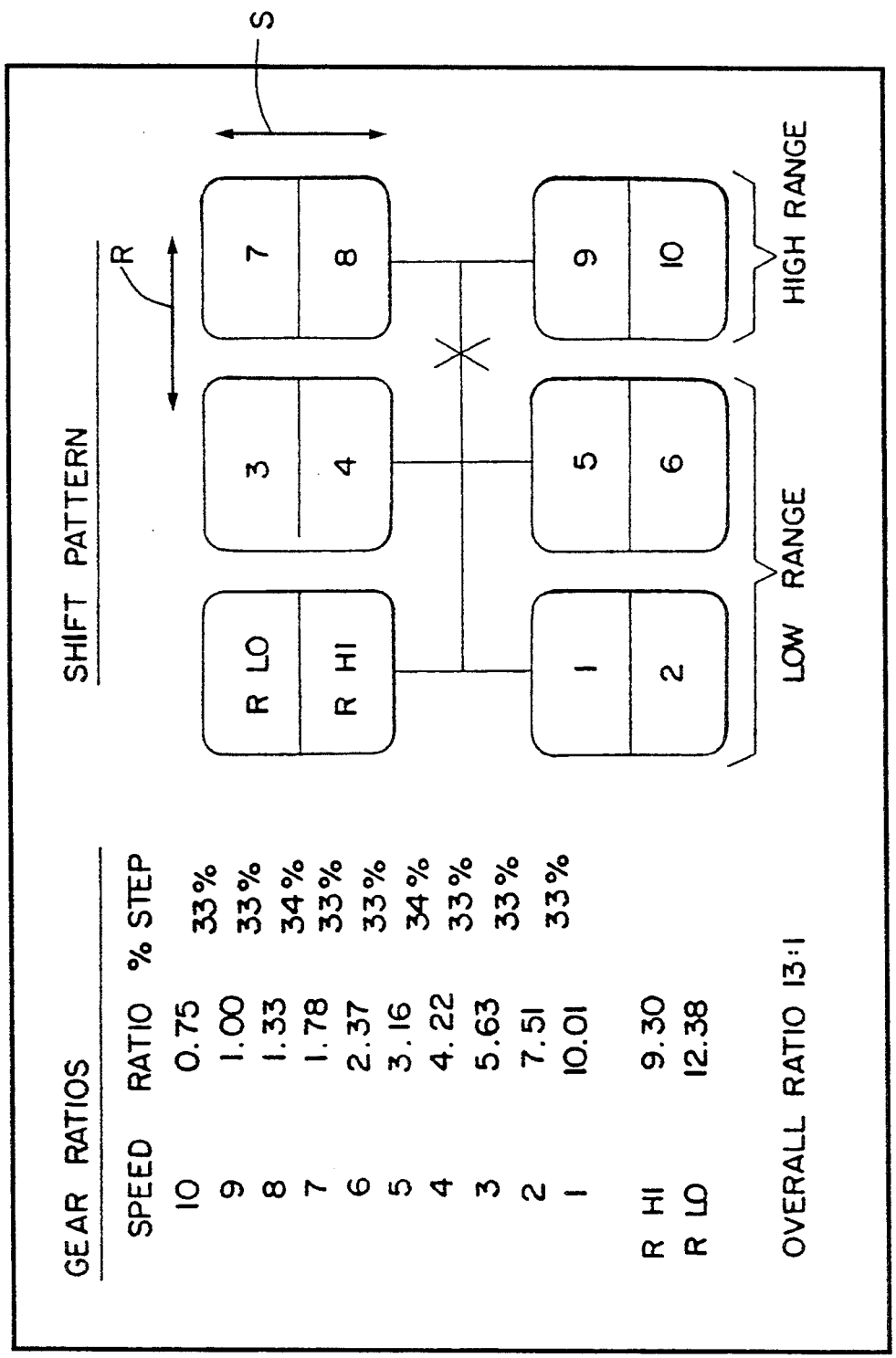
FIG. 6 illustrates a typical shift pattern and typical gear ratios for the transmission of FIGS. 1 or 2.

As may be seen by reference to FIGS. 1, 1A and 6, by selectively axially positioning both the splitter clutch 80 and the range clutch 82 in the forward and rearward axial positions thereof, four distinct ratios of mainshaft rotation to output shaft rotation may be provided. Accordingly, auxiliary transmission section 14 is a three layer auxiliary section of the combined range and splitter type providing four selectable speeds or drive ratios between the input (mainshaft 46) and output (output shaft 58) thereof. The mainsection 12 provides a reverse and three potentially selectable forward speeds. However, one of the selectable mainsection forward gear ratios, the low speed gear ratios associated with mainshaft gear 42, is not utilized in the high range. Thus, transmission 10 is properly designated as a "(2+1)×(2×2)" type transmission providing nine or ten selectable forward speeds, depending upon the desirability and practicality of splitting the low gear ratio.

Figure 2:
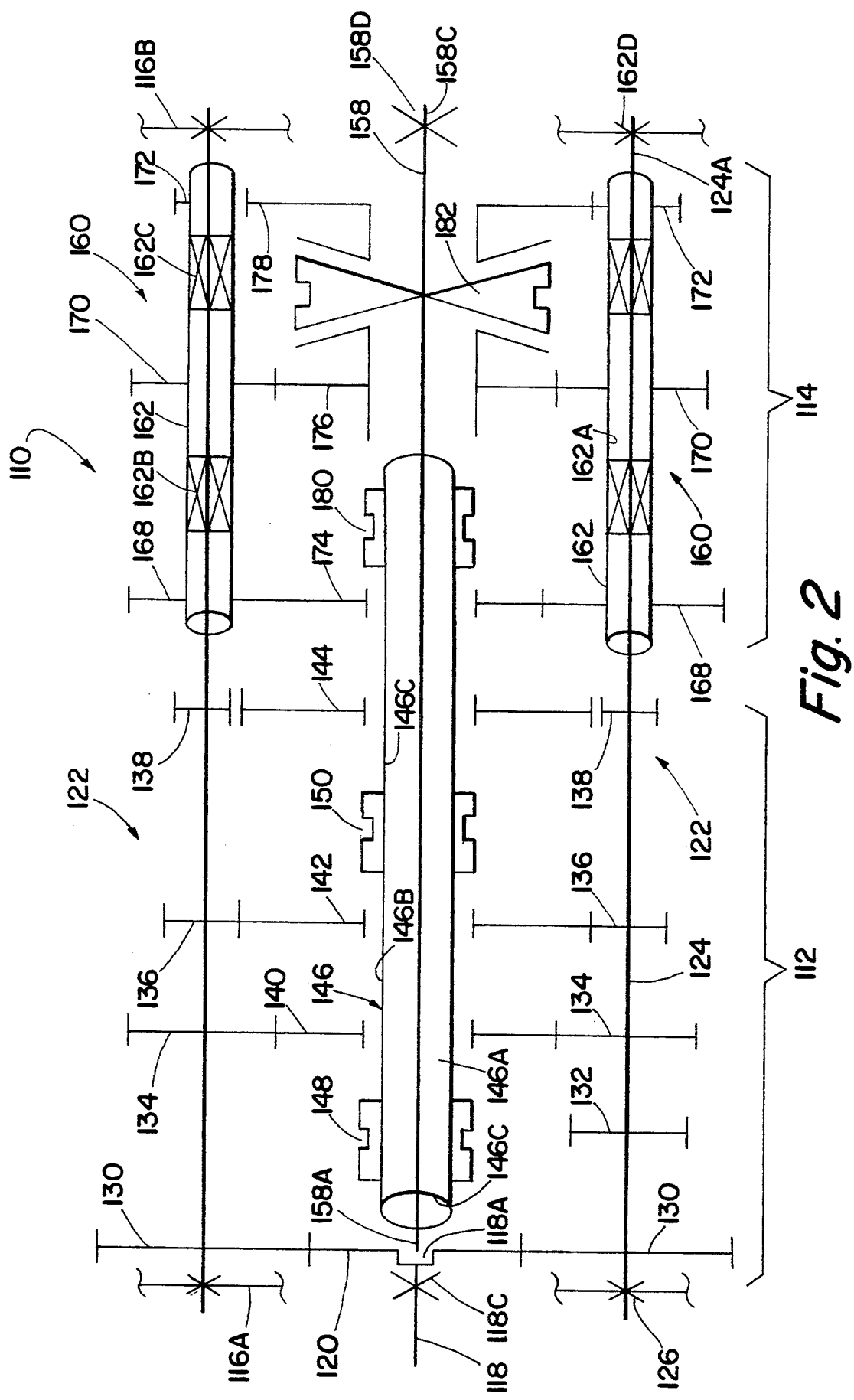
FIG. 2 is a schematic illustration of a compound transmission, comparable to the transmission of FIGS. 1 and 1A, according to the present invention.

The shift pattern for shifting transmission 10 is schematically illustrated in FIG. 6. Divisions in the vertical direction at each gear lever position signify splitter shifts while movement in the horizontal direction from the three/four and five/six leg of the H pattern to the seven/eight and nine/ten leg of the H pattern signifies a shift from the low range to the high range of the transmission. As discussed above, splitter shifting is accomplished in the usual manner by means of a vehicle operator actuated splitter button or the like, usually a button located at the shift lever knob while operation of the range clutch shifting assembly is an automatic response to movement of the gear shift lever between the central and rightwardmost legs of the shift pattern as illustrated in FIG. 2 and will be described in greater detail below. Range shift devices of this general type are known in the prior art and may be seen by reference to above-mentioned U.S. Pat. Nos. 3,429,202; 4,455,883; 4,561,325 and 4,663,725.

Referring again to FIG. 6, and assuming that it is desirable that a transmission have generally equal ratio steps, the mainsection ratio steps should be generally equal, the splitter step should be generally equal to the square root of the mainsection ratio steps and the range step should equal about the main section ratio step raised to the N power where N equals the number of mainsection ratio steps occurring in both ranges (i.e., N=2 in the (2+1)×(2×2) transmission 10). Given the desired ideal ratios, gearing to approximate these ratios is selected. In the above example, the splitter steps are about 33.3% while the range step is about 316% which is generally suitable for a "2+1" main transmission section having about 78% steps as the square root of 1.78 equals about 1.33 and 1.78 raised to the second power (i.e. N equals 2) equals about 3.16.

Housing 16, which may be a multiple piece assembly as illustrated, includes a front end wall 16A, a rear end wall 16B and an intermediate wall 16C. It is noted that beating 28 supporting the rearward end of mainsection countershaft 24, bearing 64 supporting the forward end of auxiliary countershaft 62 and beating 74A supporting gear 74 and indirectly mainshaft 46 are all supported in the intermediate wall 16C of housing 16.

In transmission 10 described above, and in the other transmissions described and claimed below, countershaft gears are shown as fixed to the countershafts while certain of the mainshaft and/or output shaft gears are shown as selectively clutchable to the shafts associated therewith. While this is the preferred construction, the present invention is equally applicable to a functionally equivalent structure wherein certain of the mainshaft and/or output shaft gears are fixed to their associated shafts and the countershaft gears are selectively clutchable to the countershafts.

In FIGS. 2, 3, 4 and 5, 10-speed transmissions 110, 210 and 310, respectively, are illustrated. Transmissions 110, 210 and 310 all utilize the structure of the present invention. The functions and operations, but not the structures, of the parts of transmissions 110, 210 and 310 are identical to the function and operation of the parts of transmission 10 illustrated in FIGS. 1 and 1A. Parts of transmissions 110, 210 and 310 corresponding functionally and operationally to pans of transmission 10 will be assigned like reference numerals with a 1, 2 or 3, respectively, prefixed thereto.

Figure 3:
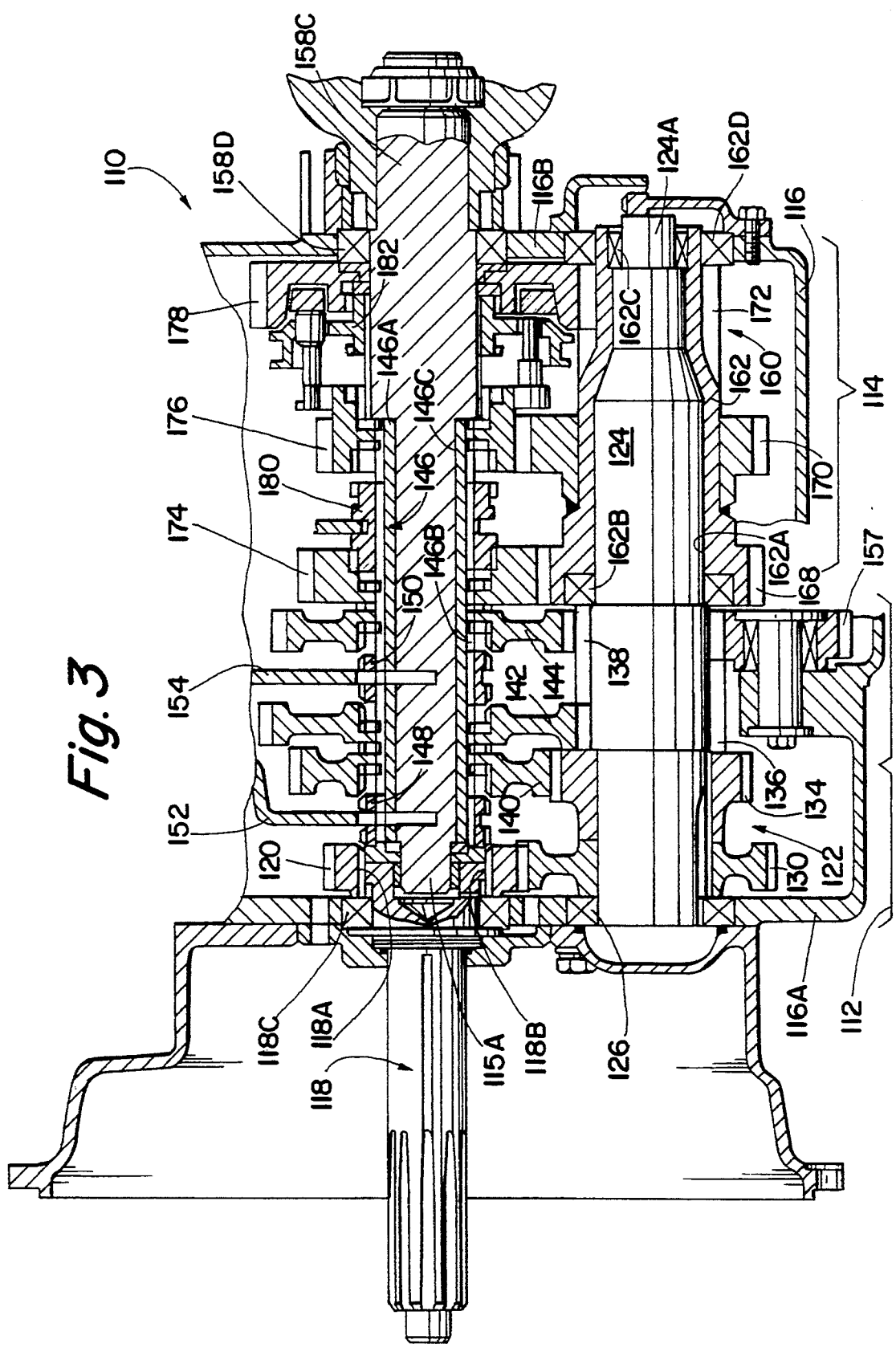
FIG. 3 is a sectional view of a preferred embodiment of the transmission of FIG. 2.

In FIGS. 2 and 3, transmission 110 of the present invention is illustrated. While different in structure, the function and operation of transmission 110 is substantially identical to that of transmission 10 described above. As with transmission 10, transmission 110 includes a mainsection 112 and an auxiliary section 114, both contained within housing 116. Housing 116 includes a forward end wall 116A and a rearward end wall 116B, but not an intermediate wall corresponding to intermediate wall 16C of transmission 10.

Input shaft 118 carries input gear 120 fixed for rotation therewith and defines a rearwardly opening pocket 118A wherein a reduced diameter extension 158A of output shaft 158 is piloted. A non-friction bushing 118B or the like may be provided in pocket or blind bore 118A. The forward end of input shaft 118 is supported by bearing 118C in front end wall 116A while the rearward end 158C of output shaft 158 is supported by bearing assembly 158D in rear and wall 116B. Bearing assembly 158D may be a pair of opposed taper bearings or a single roller or ball bearing as is illustrated in FIG. 3.

The mainshaft 146, which carries mainshaft clutches 148 and 150, and the mainshaft splitter clutch 180 is in the form of a generally tubular body 146A having an externally splined outer surface 146B and an axially extending through bore 146C for passage of output shaft 158. Shift forks 152 and 154 are provided for shifting clutches 148 and 150, respectively. Mainshaft 146 is independently rotatable relative to input shaft 118 and output shaft 158 and preferably is free for limited radial movements relative thereto.

The mainsection 112 includes two substantially identical mainsection countershaft assemblies 122 each comprising a mainsection countershaft 124 carrying countershaft gears 130, 132, 134, 136 and 138 fixed thereto. Gear pairs 130, 134, 136 and 138 are constantly meshed with input gear 118, mainshaft gears 140 and 142 and idler 157 which is meshed with reverse mainshaft gear 144, respectively.

Mainsection countershaft 124 extends rearwardly into the auxiliary section where its rearward end 124A is supported directly or indirectly in rear housing end wall 116B.

The auxiliary section 114 includes two substantially identical auxiliary countershaft assemblies 160 each including an auxiliary countershaft 162 carrying auxiliary countershaft gears 168, 170 and 172 for rotation therewith. Auxiliary countershaft gear pairs 168, 170 and 172 are constantly meshed with splitter gear 174, splitter/range gear 176 and range gear 178, respectively. Splitter clutch 180 is fixed to mainshaft 146 for selectively clutching either gear 174 or 176 thereto while synchronized range clutch 182 is fixed to output shaft 158 for selectively clutching either gear 176 or gear 178 thereto.

Auxiliary countershafts 162 are generally tubular in shape defining a through bore 162A for receipt of the rearward extensions of the mainsection countershafts 124. Bearings or bushings 162B and 162C are provided to rotatably support auxiliary countershaft 162 on mainsection countershaft 124. Bearing 162D directly or indirectly supports the rear ends of countershafts 124 and 162 in the rear end wall 116B.

Transmission 110 is functionally and operationally identical to prior art transmission 10 described above. Transmission 110 differs structurally from transmission 10 in that the mainshaft 146 is supported solely by the input and/or output shaft, one of the countershafts, mainsection countershafts 124, extends from the front end wall 11 6A to the rear end wall 116B and the other countershafts, auxiliary countershafts 162, are tubular members telescopically surrounding the one of the countershafts. This improved structure allows elimination of the intermediate wall 16C and bearings 28, 64 and 74A required for transmission 10. Compared to transmission 10, for similar capacity and reliability, transmission 110 is considerably shorter and lighter. By way of example, for a spur gear 1450 lbs. ft. input torque transmission, transmission 10 will have a length of about 25.8 inches and a weight of about 634 lbs. compared to an estimated length of about 18.7 inches and weight of about 455 lbs. for spur gear transmission 110 of the present invention and about 20.5 inches and 465 lbs. for helically geared transmission 310 of the present invention to be described below.

As alternatives to the structure of transmission 110, the input shaft 118 could extend further rearwardly to adjacent the rear end wall 116B or the input and output shafts could have inner ends meeting for mutual support at a point intermediate the end walls of the transmission.

As with transmission 10, one or more of the jaw clutches 148, 150 and/or 180 could be blocked and/or synchronized. While the structure of the present invention is especially advantageous for multiple substantially identical countershaft type transmissions, it is also applicable to single countershaft and swap shaft type transmissions.

Figure 4:
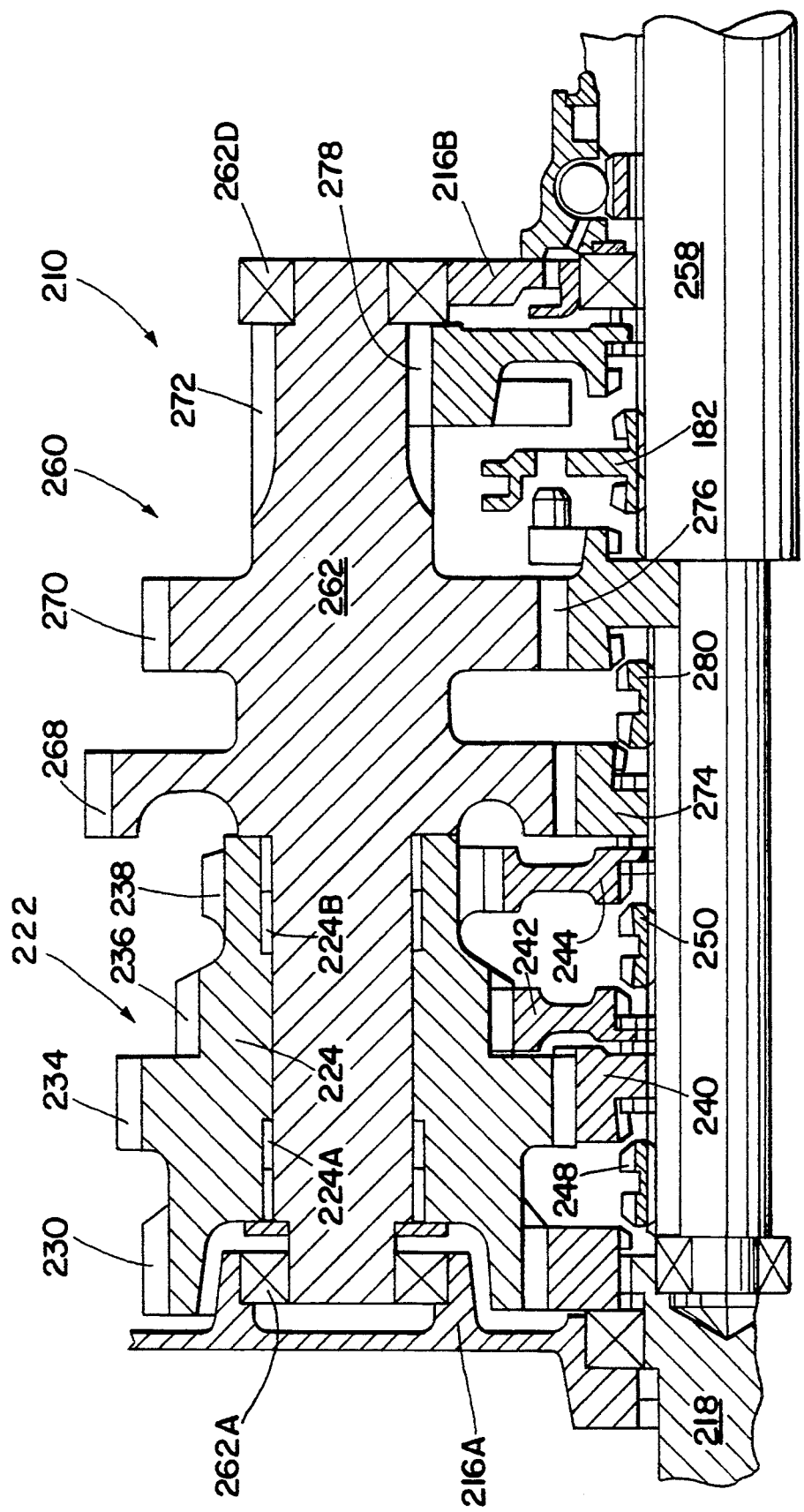
FIG. 4 is a sectional view of an alternate embodiment of the transmission of FIG. 2.

FIG. 4 illustrates a portion of transmission 2 10, an alternate embodiment of the present invention. Transmission 210 differs from transmission 110 in that the auxiliary countershaft 262 extends from the rear end wall 216B to the front end wall 216A and is rotatably supported therein by bearings 262B and 268A, respectively. The mainsection countershaft assembly 222 comprises a generally tubular mainsection countershaft 224 carrying mainsection countershaft gears 230, 234, 236 and 238 fixed for rotation therewith. Needle beatings 224A and 224B support shaft 224 for rotation on the forward extension of auxiliary countershaft 262.

Except as noted above, the structure, operation and function, and the advantages, of transmission 210 is substantially identical to that of transmission 110.

Figure 5:
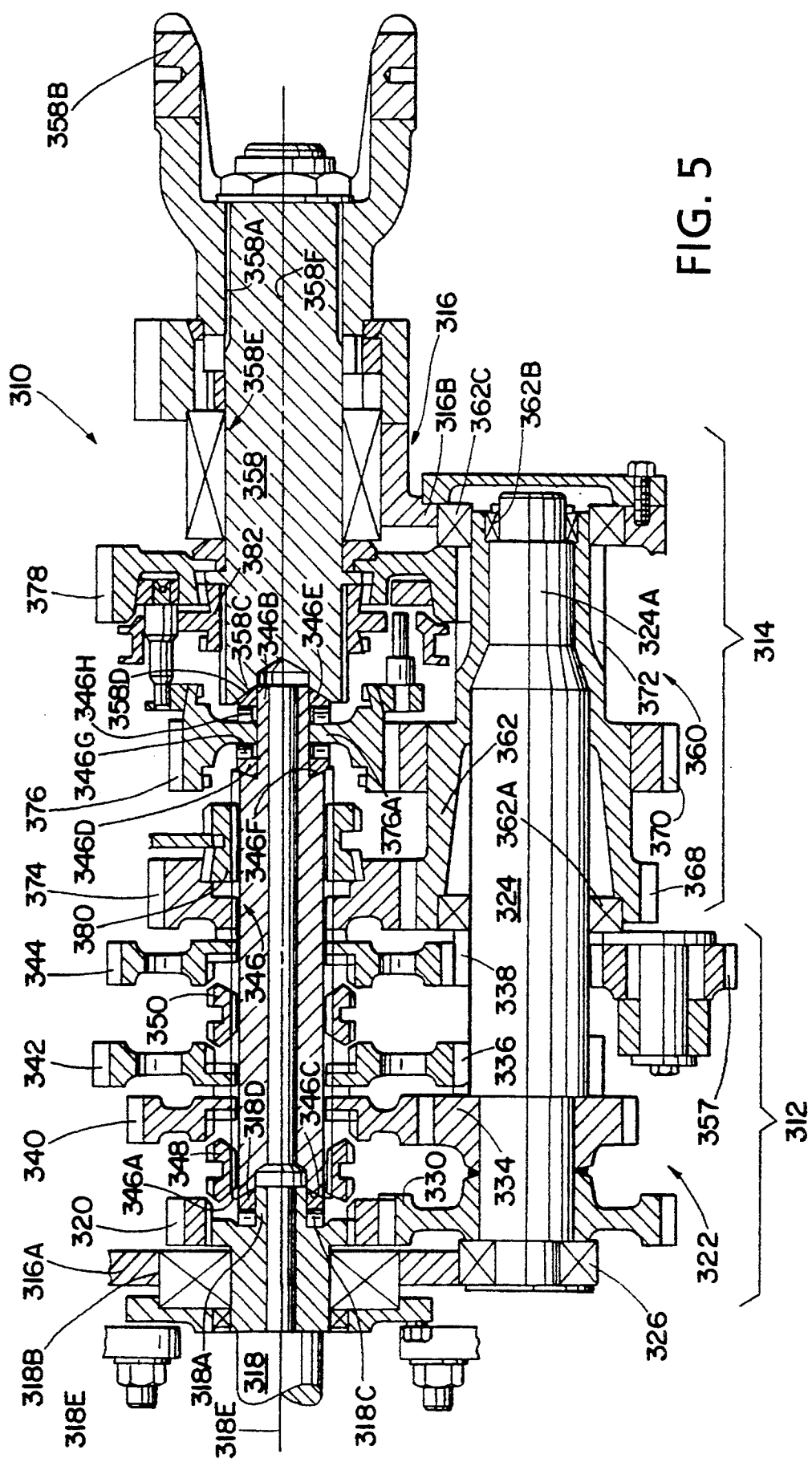
FIG. 5 is a sectional view of another alternate embodiment of the transmission of FIG. 2.

Transmission 310, an alternate embodiment of the present invention, is illustrated in FIG. 5. Transmission 310 has been designed primarily for helical gearing while the transmissions 10, 110 and 210 are intended primarily for spur gearing.

As with transmissions 10, 110 and 210 described above, transmission 310 is a "(2+1)×(2×2)" type compound transmission comprising a main section 312 and an auxiliary section 314 connected in series therewith, both within a common housing 316 having a forward 316A and a rearward 316B end wall but not an intermediate wall corresponding to intermediate wall 16C of prior art transmission 10.

While the various embodiments of the present invention have been illustrated as "(2+1)×(2×2)" compound transmissions, the present invention is not so limited and is applicable to a wide variety of types of compound transmissions.

Input shaft 318 carries input gear 320 fixed for rotation therewith and defines an inwardly extending reduced diameter portion 318A which directly or indirectly supports the front end 346A of mainshaft 346. Output shaft 358 extends from the rear end of transmission 310 and carries splines 358A for receipt of an output flange 358B. The inner end 358C of output shaft 358 is provided with an inwardly and rearwardly tapered surface 358D for direct or indirect support of the rear end 346B of mainshaft 346.

Input shaft 318 is supported in front end wall 316A by taper roller bearing 318B while output shaft 358 is supported in rear end wall 316B by dual taper roller bearing assembly 358E.

The mainshaft 346 carries mainshaft clutches 348 and 350 and the splitter clutch 380, and extends generally coaxially between and is supported by the inner ends of the input and output shafts. Mainshaft gears 340, 342 and 344, splitter gear 374 and splitter/range gear 376 surround the mainshaft, preferably for limited radial movement relative thereto, and are selectively clutchable thereto by clutches 348, 350 and 380. Range clutch 382 is carried by output shaft 358 which is surrounded by splitter/range gear 376 and range gear 378. Clutch 382 is effective to clutch either gear 376 or gear 378 to the output shaft 358. The function and operation of transmission 310 is the same as that of transmission 10, 110 and 210 discussed above.

The countershaft assemblies 322 and 360, respectively, are substantially identical to the mainsection and auxiliary countershaft assemblies 122 and 160 of transmission 110 described below. Briefly, mainsection countershaft(s) 324 carries countershaft gears 330, 334, 336 and 338 fixed thereto which are constantly meshed with and/or support, gears 318, 340, 342 and idler gear 357 while auxiliary countershaft(s) 362 carries auxiliary countershaft gears 368, 370, 372 which are constantly meshed with gears 374, 376 and 378. The auxiliary countershafts are generally tubular and telescopically surrounds the rear end 324A of the mainsection countershaft and is directly or indirectly rotatably supported by bearings 362A, 362B and 362C thereon. A bearing 326 supports the forward end of countershaft 324 in front wall 316A while a bearing 362C supports, directly or indirectly, the rearward end of countershaft 324 in the rear end wall 316B.

The reduced diameter extension 318A of the input shaft 318 carries an axial roller bearing 318C and a generally spherical washer 318D of bearing steel which will abut a generally complimentary radially inwardly and axially rearwardly tapered surface 346C provided on the front end 346A of the mainshaft 346. The hub portion 376A of range/splitter gear 376 surrounds the reduced diameter rearward portion 346B of the mainshaft 346 which also carries two spherical washers 346D and 346E, structurally identical to washer 318D, which interact with generally complimentary inclined surfaces 346F on the mainshaft and 358D on the output shaft, respectively. Axial roller bearings 346G and 346H separate the spherical washers frown the hub portion 376A.

Axial bearings are bearings designed to transmit an axial load between two relatively rotatable members. A typical axial beating will include rollers having an axis rotation extending radially relative to the axis of rotation 318E/358F of the relatively rotating pans.

The mainshaft 346 is thus supported directly or indirectly at its front end by input shaft 318 while the spherical washer 318D and surface 346C allow for a limited amount of radial movement of the mainshaft relative to the axis of rotation 318E of the input shaft. The mainshaft is supported directly or indirectly at its rear end by the output shaft 358 while spherical washers 346D and 346E interact with tapered surfaces 346F and 358D to allow a limited amount of radial movement of the mainshaft relative to the axis of rotation 358F of the output shaft 358 which is substantially coaxial with axis 318E.

As indicated previously, all or substantially all of the gearing of transmission 310 is helical which results in the creation of axial forces on the various transmission components. Forward axial forces on the mainshaft 346 and/or on the splitter/range gear 376 will be transferred to the housing through beatings 346G, 318C and/or 318B while rearward axial forces on the mainshaft and splitter/range gear will be transferred to the housing through beatings 346G, 346H and/or 358E.

Accordingly, the mainshaft 346 is supported solely by the input and output shafts, preferably with a limited degree of radial freedom or float, requiting no intermediate support to the housing and allowing the transfer of axial forces associated with helical gearing to the housing through appropriate bearings.

Figure 5A:
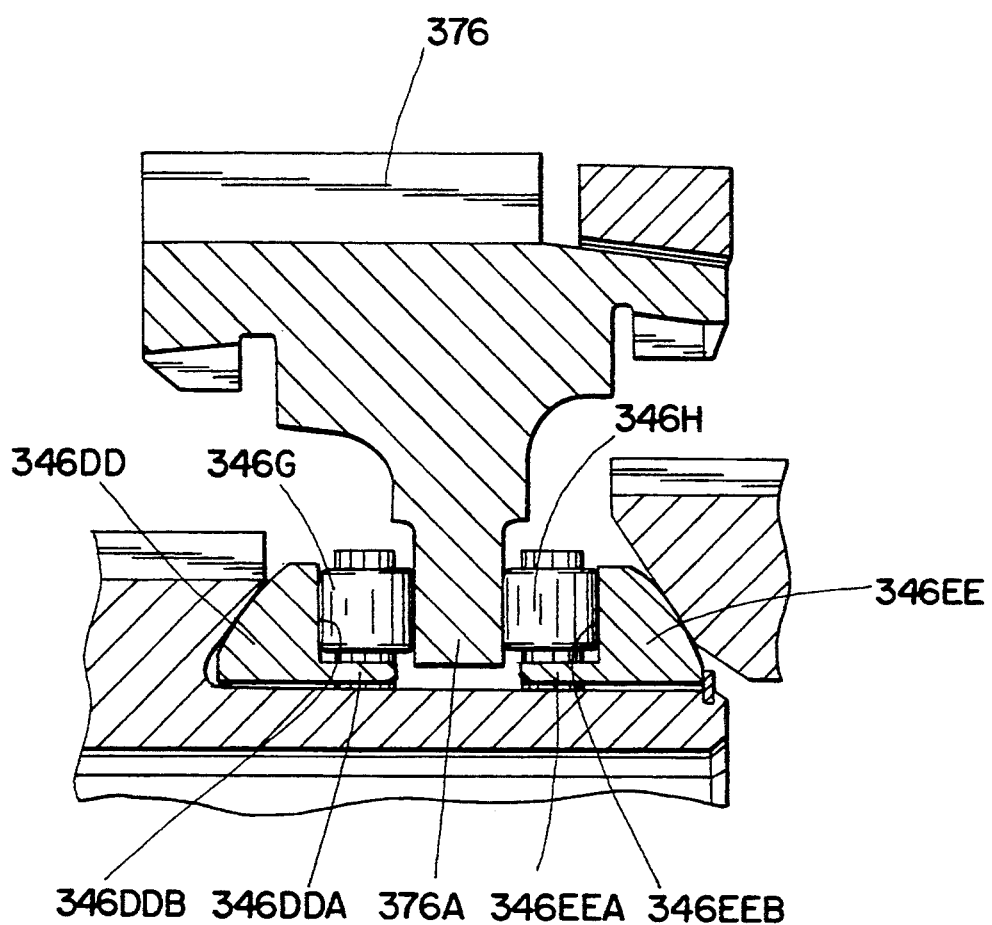
FIG. 5A is a partial view illustrating a structural modification of the transmission of FIG. 5.

FIG. 5A illustrates a structural modification to transmission 310. Briefly, the spherical washers 346DD and 346EE replace the washers 346D and 346E illustrated in FIG. 5. Washers 346DD and 346EE include axially extending hubs 346DDA and 346EEA which provide a pilot surface for bearings 346G and 346H respectively to maintain the beating cages and rollers parallel to surfaces 346DDB and 346EEB respectively.

Figure 7:
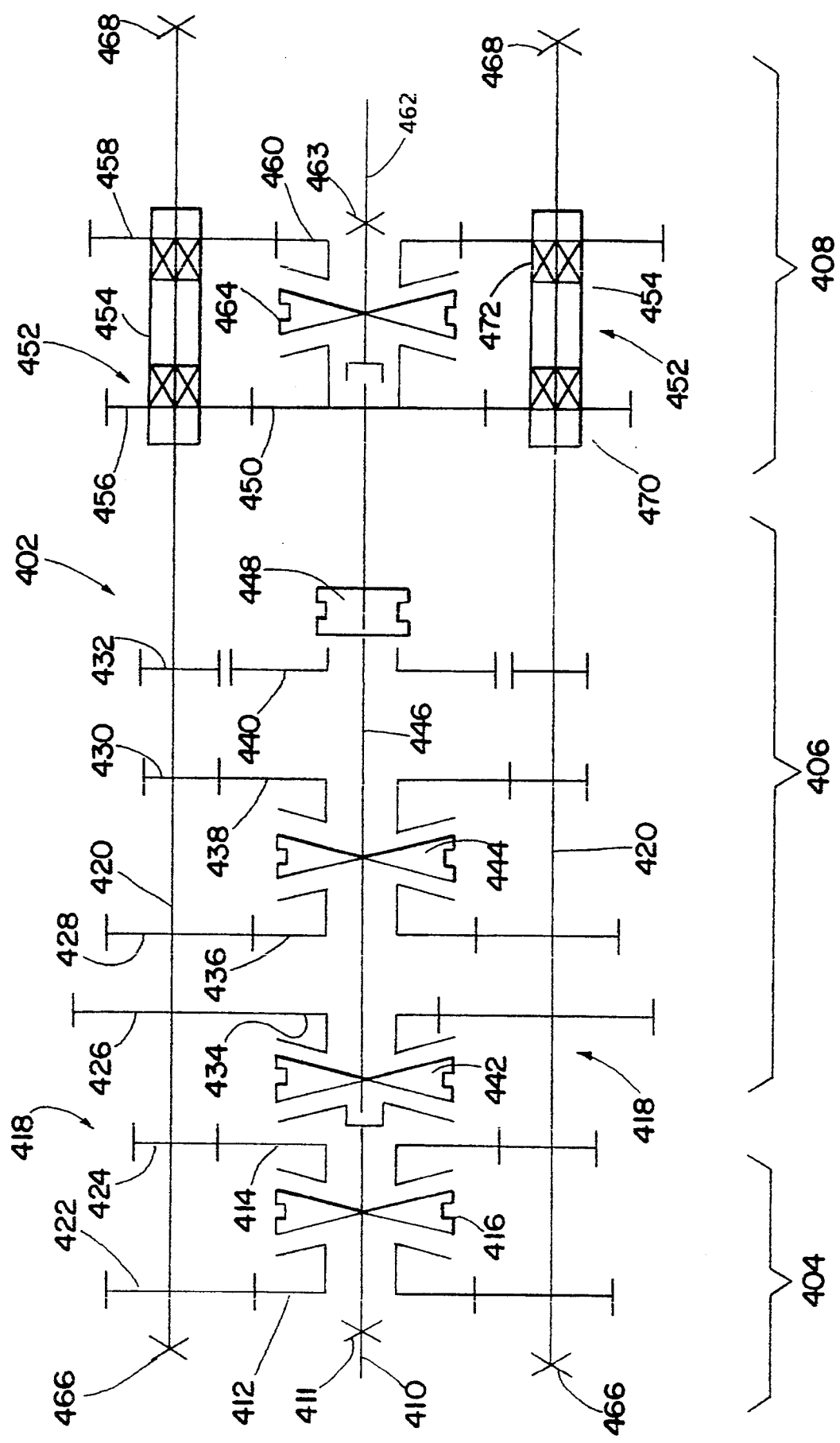
FIG. 7 illustrates a further alternate embodiment of the present invention.

A further alternate embodiment of the present invention, transmission 402, is schematically illustrated in FIG. 7. Unlike transmissions 10, 110, 210 and 310 described above, transmission 402 is a "(2)×(4)×(2)" type 16-speed transmission having a two-speed splitter section 404, a four forward-speed mainsection 406 and a two-speed range section 408, all connected in series.

Briefly, an input shaft 410 is supported in the transmission housing forward wall (not shown) by beating 411 and is surrounded by two input gears 412 and 414, a selected one of which is clutched to the input shaft by synchronized clutch 416 to provide a two-speed splitter input section. Front countershaft assemblies 418 each include a countershaft 420 carrying countershaft gears 422, 424, 426, 428, 430 and 432. Gears 422 and 424 are constantly meshed with the input gears 412 and 414. In mainsection 416, gears 426, 428, 430 and 432 are constantly meshed with mainshaft gears 434, 436, 438 and a reverse idler (not shown) meshed with reverse mainshaft gear 440. Double acting synchronized clutches 442 and 444 are provided on mainshaft 446 to clutch the mainshaft 446 to a selected one of the input shaft 410 or mainshaft gears 434, 436 or 438. Non-synchronized clutch 448 is used to clutch the reverse mainshaft gear 440 to the mainshaft 446.

The rearward end of mainshaft 446 extends into the two-speed range section 408 and carries gear 450 fixed for rotation therewith. A pair of auxiliary section countershaft assemblies 452 each include an auxiliary section countershaft 454 carrying two auxiliary section countershaft gears 456 and 458. Gear 456 is constantly meshed with auxiliary input gear 450 while gear 458 is constantly meshed with an output gear 460 surrounding output shaft 462. Output shaft 462 is supported in the housing rear end wall (not shown) by beating(s) 463. A two-position synchronized range clutch 464 is carded by the output shaft 462 and is utilized to clutch either output gear 460 or mainshaft 446 to the output shaft 462.

Bearings 466 and 468 are used to rotatably mount the front countershafts 420 to the forward and rearward end walls (not shown) of a transmission housing. Auxiliary countershafts 254 are generally tubular members telescopically surrounding the rear ends of the front countershafts and maybe supported thereon by needle bearings 470 and 472 or the like. The mainshaft is supported by the input shaft and/or output shaft in a manner similar that illustrated in either transmission 110, 210 or 310 described above.

Figure 8:
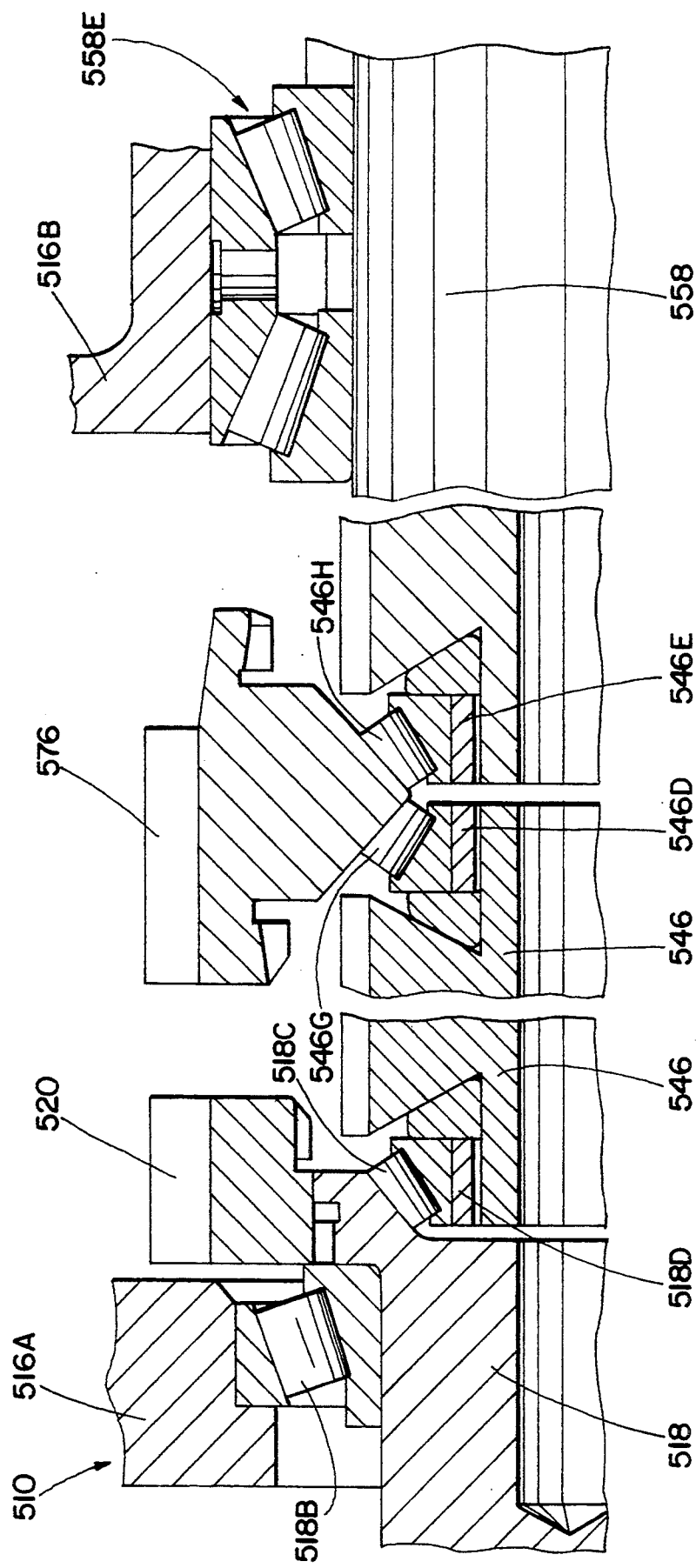
FIG. 8 is a partial sectional view of an alternate embodiment of the present invention.

A further alternate embodiment 5 10 of the present invention is illustrated in FIG. 8. Transmission 510 is similar to transmission 310 except that the rearward end of mainshaft 546 and the forward end of output shaft 558 each support and are supported by splitter/range gear 576 through spherical washers 546D and 546E and taper rollers bearings 546G and 546H, and axial bearings 318C, 346G and 346H are replaced by taper roller bearings 518C, 546G and 546H, respectively.

Although the present invention has been described with a certain degree of particularity, it is understood that various changes to form and detail may be made without departing from the spirit and the scope of the invention as hereinafter claimed.

I claim:

1. A compound change gear transmission (110) comprising a multiple-speed main transmission section (112) connected in series with a multiple speed auxiliary transmission section (114), said compound change gear transmission being one of the range, splitter or combined range/splitter type, said main and auxiliary transmission sections contained within a common transmission housing (116) defining a forward end wall (116A) and a rearward end wall (116B), said main transmission section including a main section countershaft (124) carrying at least two (130, 134, 136) main section countershaft gears fixed thereto, and said auxiliary transmission section including an auxiliary section countershaft (162) carrying at least two (168, 170, 172) auxiliary section countershaft gears fixed thereto; said transmission characterized by:
said main section and auxiliary section countershafts being independently rotatable and coaxial and together defining a coaxial assembly of countershafts supported for rotation in said housing solely by bearings carried by said forward and said rearward end walls.

2. A compound change gear transmission (110) comprising a multiple-speed main transmission section (112) connected in series with a multiple speed auxiliary transmission section (114), said compound change gear transmission being one of the range, splitter or combined range/splitter type, said main and auxiliary transmission sections contained within a common transmission housing (116) defining a forward end wall (116A) and a rearward end wall (116B), said main transmission section including a main section countershaft (124) carrying at least two (130, 134, 136) main section countershaft gears fixed thereto, and said auxiliary transmission section including an auxiliary section countershaft (162) carrying at least two (168, 170, 172) auxiliary section countershaft gears fixed thereto; said transmission characterized by:
one of said countershafts extending from said forward end wall to said rearward end wall and rotationally supported in said housing by bearings carried by said forward and rearward end walls, the other of said countershafts being of generally tubular shape and telescopically surrounding said one of said countershafts for independent rotation relative thereto.

3. A compound transmission (110) comprising a multiple speed first section (112) connected in series with a multiple speed second section (114), said first and second sections contained within a common housing defining a forward end wall (116A) and a rearward end wall (116B);
said first section comprising an input shaft for connection to a prime mover, at least one input gear fixable to said input shaft, a mainshaft generally coaxial with said input shaft and extending into said second section, at least one first section countershaft rotatably supported in said housing and having a first first section countershaft gear (130) and a second first section countershaft gear (134, 136) fixed thereto, said first first section countershaft gear constantly meshed with said input gear, at least one mainshaft gear surrounding said mainshaft and constantly meshed with said second first section countershaft gear and first section clutch means carried by said mainshaft for selectively fixing said mainshaft gear to said mainshaft for rotation therewith;
said second section comprising at least one second section countershaft coaxial with said first section countershaft and rotatably supported in said housing, an output shaft generally coaxial with said mainshaft rotatably supported in said housing, a first second section countershaft gear (168, 170) and a second second section countershaft gear (170, 172) fixed to said second section countershaft, said first second section countershaft gear constantly meshed with a first central gear (174, 176) fixable to said mainshaft, at least one second central gear (176, 178) constantly meshed with said second second section countershaft gear and second section clutch means (180, 182) for selectively clutching at least one of (i) said first central gear to said mainshaft, (ii) said second central gear to said output shaft, and (iii) said mainshaft to said output shaft;
said transmission characterized by:
said first and second section countershafts being independently rotatable in said housing and together defining an assembly of countershafts rotatably supported in said housing solely by bearing means (126, 162D) mounted in said forward end wall and in said rearward end wall.

4. The compound transmission of claim 3 wherein one of said first and second section countershafts defines a generally tubular portion telescopically surrounding a portion of the other of said first and second section countershafts.

5. The transmission of claim 4 wherein said tubular portion defines an inner diameter surface and the surrounded portion defines an outer diameter surface, and additionally comprising bearing means between the inner diameter surface of said tubular portion and the outer diameter surface of said surrounded portion.

6. The compound transmission of claims 3, 4 or 5, wherein said first section is a main transmission section and said second section is an auxiliary transmission section of one of the range, splitter or combined range/splitter type and wherein said main transmission section comprises a plurality of substantially identical countershafts equally circumferentially spaced about said mainshaft, said auxiliary transmission section comprises a plurality of substantially identical second section countershafts substantially equally circumferentially spaced about said output shaft and each first section countershaft forms an assembly of countershafts with one of said second section countershafts, each of said assemblies rotatably supported in said housing solely by bearing means mounted in said forward end wall and in said rearward end wall.

7. The compound transmission of claim 6 wherein said input shaft and said output shaft are coaxial about a common axis of rotation and said mainshaft and said mainshaft gear are radially floatable relative to the axis of rotation of said input shaft and output shaft.

8. The compound transmission of claim 6 wherein a single input gear is permanently fixed to said input shaft for rotation therewith.

9. The compound transmission of claim 6 wherein a plurality of input gears surround said input shaft for rotation relative thereto and an input clutch is provided for selectively rotationally fixing a selected one of said input gears to said input shaft.

10. The compound transmission of claim 6 wherein said first section clutch means is additionally effective to selectively fix said input shaft to said mainshaft for rotation therewith.

11. The compound transmission of claim 3 wherein a plurality of input gears surround said input shaft for rotation relative thereto and an input clutch is provided for selectively rotationally fixing a selected one of said input gears to said input shaft.

12. The compound transmission of claim 5 wherein said input shaft is supported in said housing by bearings mounted in said forward end wall, said output shaft is supported in said housing by bearings mounted in said rearward end wall, and said mainshaft is supported in said housing solely by at least one of said input shaft and said output shaft.

13. The compound transmission of claim 12 wherein said input shaft rearward end and said output shaft forward end are axially overlapping in mutually-supporting fashion.

14. The compound transmission of claim 13 wherein said mainshaft is of a generally tubular shape and telescopically surrounds at least one of said input shaft and said output shaft.

15. The compound transmission of claim 12 wherein said mainshaft is of a generally tubular shape and telescopically surrounds at least one of said input shaft and said output shaft.

16. The compound transmission of claims 12, 13, 14 or 15, wherein a single input gear is permanently fixed to said input shaft for rotation therewith.

17. The compound transmission of claims 12, 13, 14 or 15, wherein a plurality of input gears surround said input shaft for rotation relative thereto and an input clutch is provided for selectively rotationally fixing a selected one of said input gears to said input shaft.

18. The compound transmission of claims 12, 13, 14 or 15, wherein said mainshaft clutch means is additionally effective to selectively fix said input shaft to said mainshaft for rotation therewith.

19. A vehicular compound change gear transmission (110/310) comprising a multiple speed main transmission section (112/312) connected in series with a multiple speed auxiliary transmission section (114/314) of one of the range, splitter or combined range/splitter type, said main transmission section and auxiliary transmission section contained within the common transmission housing (116/316) defining a forward end wall (116A/316A) and a rearward end wall (116B/316B);

said main transmission section comprising an input shaft (118/318) for connection to a prime mover and rotatably supported in said housing by input shaft bearings (118C/318C) carried by said forward end wall, at least one input gear (120/320) rotatably fixable to said input shaft for rotation therewith, a mainshaft (146) generally coaxial with said input shaft and extending into said auxiliary transmission section, a plurality of main section countershafts (124) equally circumferentially spaced about said mainshaft, rotatably supported in said housing and driven by said input shaft, a plurality of main section countershaft gears (134, 136, 138) fixed to each of said main section countershafts, one of said main section countershaft gears fixed to each of said main section countershafts constantly meshed with said input gear, a plurality of mainshaft gears (140, 142, 144) surrounding said mainshaft and each constantly meshed with one of said main section countershaft gears fixed to each of said main section countershafts and main section clutch means (148, 150) carried by said mainshaft for selectively fixing selected ones of said mainshaft gears to said mainshaft for rotation therewith;

said auxiliary transmission section (114) comprising a plurality of substantially identical auxiliary section countershafts (162) coaxial with said main section countershafts and rotatably supported in said housing, an output shaft (158) generally coaxial with said input shaft and said mainshaft and rotatably supported in said housing by output shaft bearing mean (158D) carried by said rearward end wall (116B), a first auxiliary section countershaft gear (168, 170) and a second auxiliary section countershaft gear (170, 172) fixed to each of said auxiliary section countershafts, said first auxiliary section countershaft gear constantly meshed with a first central gear (174, 176) fixable to said mainshaft, a second central gear (176, 178) constantly meshed with a second auxiliary section countershaft gear fixed to each of said auxiliary section countershafts and auxiliary section clutch means (182) for selectively clutching at least one of (i) said first central gear to said mainshaft, (ii) said second central gear to said output shaft or (iii) said mainshaft to said output shaft;

said transmission characterized by:

said main transmission section countershafts and said auxiliary section countershafts being independently rotatable in said housing and coaxial ones of said main transmission section countershafts and said auxiliary transmission countershafts together defining an assembly of countershafts rotatably supported in said housing solely by bearing means (124A, 162D) mounted in said forward end wall and in said rearward end wall.

20. The compound transmission of claim 19 wherein one of each of said coaxial main section and auxiliary section countershafts defines a generally tubular portion (162) telescopically surrounding a portion of the other of said coaxial main and auxiliary section countershafts.

21. The compound transmission of claim 20 wherein said tubular portion defines an inner diameter surface and the surrounded portion defines an outer diameter surface, and additionally comprising bearing means (162B, 162C) between the inner diameter surface (162A) of said tubular portion and the outer diameter surface of said surrounded portion.

22. The compound transmission assembly of claim 21 wherein said main transmission section countershaft (124) extends from said forward end wall to said rearward end wall and said auxiliary transmission section countershaft (162) is the generally tubular countershaft.

23. The compound transmission of claim 22 wherein the rearward end of said auxiliary section transmission countershaft (162) is directly supported in said rearward end wall (116B) by said beating means (162D) and said main transmission section countershaft is rotatably supported within said auxiliary transmission section countershaft at a location adjacent the rearward end thereof.

24. The compound transmission of claims 19, 20, 21, 22 or 23, wherein said mainshaft is supported in said housing solely by at least one of said input shaft and said output shaft.

25. The compound transmission of claim of 24 wherein said mainshaft (146) is generally tubular in shape and defines an inner diameter surface (146C) telescopically surrounding at least one of said input shaft and said output shaft.

26. The compound transmission of claims 19, 20, 21, 22 or 23, wherein said input section comprises a single input gear fixed to said input shaft for rotation therewith.

27. The compound transmission of claims 19, 20, 21, 22 or 23, wherein a plurality of input gears surround said input shaft for rotation relative thereto and an input clutch is provided for selectively rotationally fixing a selected one of said input gears to said input shaft.

* * * * *